(12) United States Patent
González García

(10) Patent No.: US 12,168,991 B2
(45) Date of Patent: Dec. 17, 2024

(54) LOCKING MECHANISM FOR FOLDING CHASSIS OF ELECTRIC CUTTING MACHINES

(71) Applicant: GERMANS BOADA, S.A., Rubi (ES)

(72) Inventor: Jesús González García, Rubi (ES)

(73) Assignee: GERMANS BOADA, S.A., Rubi (ES)

(*) Notice: Subject to any disclaimer, the term of this patent is extended or adjusted under 35 U.S.C. 154(b) by 533 days.

(21) Appl. No.: 17/610,393

(22) PCT Filed: Feb. 10, 2020

(86) PCT No.: PCT/ES2020/070091
§ 371 (c)(1),
(2) Date: Nov. 10, 2021

(87) PCT Pub. No.: WO2021/160902
PCT Pub. Date: Aug. 19, 2021

(65) Prior Publication Data
US 2022/0252095 A1    Aug. 11, 2022

(51) Int. Cl.
*F16B 2/06*    (2006.01)
*B25H 1/00*    (2006.01)
*F16M 11/38*    (2006.01)

(52) U.S. Cl.
CPC .............. *F16B 2/06* (2013.01); *B25H 1/0042* (2013.01); *F16M 11/38* (2013.01); *F16M 2200/02* (2013.01)

(58) Field of Classification Search
CPC ....... F16B 2/06; F16M 11/38; F16M 2200/02; B25H 1/0042
See application file for complete search history.

(56) References Cited

U.S. PATENT DOCUMENTS 7,815,215 B1 * 10/2010 Lowe ..................... B25H 3/02
                                                    280/47.35
8,061,732 B2 * 11/2011 Song ...................... B62B 7/08
                                                    280/647
(Continued)

FOREIGN PATENT DOCUMENTS

CN    103277647    9/2013
EP    1925406      5/2008

OTHER PUBLICATIONS

WIPO, International Search Report for PCT/ES2020/070091, Jun. 22, 2020.

*Primary Examiner* — Monica E Millner
(74) *Attorney, Agent, or Firm* — Hodgson Russ LLP

(57) ABSTRACT

A locking mechanism for the folding chassis of electric cutting machines. The chassis (1) comprises: a supporting base (11), a tilting arm (12), and an end arm (13) bearing wheels (14) that are collapsible with respect to a principal arm (10) between a folded and an unfolded position of the chassis. The locking mechanism (2) is installed on the tilting arm (12) and comprises: a locking clip (21) capable of being turned manually between an operative position for the locking of the chassis (1) wherein it is coupled with a number of locking rods (112, 113), and an unlocked position of the chassis (1); a manually displaceable trigger for the retaining of the locking clip in the operational position or the free position; and an elastic element that tends to displace the locking clip (21) and the trigger (22) towards the unlocked position of the chassis (1).

11 Claims, 9 Drawing Sheets

(56) References Cited

U.S. PATENT DOCUMENTS

| | | | |
|---|---|---|---|
| 8,910,970 B2* | 12/2014 | Chen | B25H 1/04 |
| | | | 280/652 |
| 9,669,540 B2* | 6/2017 | Chen | A47B 3/02 |
| 2006/0038383 A1 | 2/2006 | Wu | |
| 2007/0012826 A1* | 1/2007 | Liu | B25H 1/04 |
| | | | 248/129 |
| 2008/0115701 A1* | 5/2008 | Sugiura | B25H 1/04 |
| | | | 108/131 |
| 2014/0124631 A1* | 5/2014 | Olander | F16M 11/10 |
| | | | 248/176.1 |
| 2015/0328700 A1 | 11/2015 | Chang | |
| 2019/0240858 A1 | 8/2019 | Torres | |

* cited by examiner

LOCKING MECHANISM FOR FOLDING CHASSIS OF ELECTRIC CUTTING MACHINES

CROSS-REFERENCE TO RELATED APPLICATIONS

This application is a U.S. national stage entry of International Application No. PCT/ES2020/070091, filed Feb. 10, 2020, the entire disclosure of which is incorporated herein by reference.

TECHNICAL FIELD

This invention is applicable in the sector dedicated to the manufacture of folding chassis for electric cutting machines.

BACKGROUND

Currently, electric cutting machines are known which have a folding chassis to facilitate the transport and use thereof in different work areas.

These folding chassis generally have a principal supporting arm, by way of a frame, to support the cutter and folding legs, the chassis comprising folding legs for fixing and locking the legs in the folded position and in the unfolded position.

These locking means are made up of fixing screws that must be screwed and unscrewed each time the chassis is folded and unfolded, and which have several drawbacks, including the risk of losing said fixing screws, the need to use tools to achieve proper tightening of the fixing screws and the excessive time involved in the operations of locking and unlocking the fixing mechanism each time the supporting chassis of the electric cutting machine is folded or unfolded.

Therefore, the problem posed is the development of a locking mechanism that makes it possible to solve the aforementioned drawbacks.

SUMMARY

The locking mechanism object of this invention has technical features that enable the aforementioned drawbacks to be resolved, the actuation of which is carried out quickly and easily, manually displacing a single part to lock the chassis in either of the two folding and unfolding positions and manually actuate another part to achieve the unlocking thereof.

According to the invention, the locking mechanism is applicable in folding chassis of electric cutting machines provided with a folding chassis comprising: a principal supporting arm, a supporting base and a tilting arm that are collapsible with respect to the principal arm and related to each other by an end arm bearing wheels and that collapses together with the supporting base and with the tilting arm during the folding and unfolding of the chassis.

The locking mechanism is installed on the tilting arm of the chassis and comprises:

- a locking clip installed on the tilting arm capable of being turned between: an operative position for the locking of the chassis in the folded position and in the unfolded position, and an inoperative position for the unlocking of the chassis; said clip comprising: a rear coupling recess in a first locking rod of the chassis in the unfolded position; said first locking rod being fixed to the end arm; and a front coupling recess in a second locking rod of the chassis in the folded position, said second locking rod being fixed in an upper area of the supporting base;
- a trigger that is displaceable between: a position for the retaining of the locking clip in the operative position for the locking of the chassis, and a free position in which it enables the locking clip to be displaced towards the inoperative position.
- an elastic element that tends to displace the locking clip towards the inoperative position, and to displace the trigger towards the inoperative position for the unlocking of the chassis.

According to the invention, the trigger comprises an appendix facing the locking clip and which, in the operative position for the locking of the chassis, acts against a stop of the locking clip, retaining it in said locked position; returning the locking clip to the inoperative position by the action of the elastic element when the trigger is manually displaced towards the free position.

To lock the chassis in the folded position or in the unfolded position, it is sufficient to face the rear recess or the front recess with the first or the second locking rod and manually push the clip towards the locked position, overcoming the resistance of the elastic element until the rear recess or the front recess is coupled in the corresponding locking rod.

This actuation automatically causes the displaceable trigger to be placed in the position for the retaining of the locking clip in the operative locked position by the action of the elastic element.

To unlock the chassis in either of the folded or unfolded positions, it is sufficient to manually displace the trigger, overcoming the resistance of the elastic element towards a free position of the locking clip, which causes said locking clip to automatically return to the unlocked position by the action of the elastic element.

This locking mechanism enables the actuation thereof to be significantly simplified, which is completely manual and practically intuitive, achieving the proposed objective.

The features of the invention shall be more readily understandable in light of the exemplary embodiment shown in the figures described below.

BRIEF DESCRIPTION OF THE DRAWINGS

As a complement to the description provided herein, and for the purpose of helping to make the features of the invention more readily understandable, the present specification is accompanied by a set of drawings which, by way of illustration and not limitation, represent the following.

DETAILED DESCRIPTION

Figure 1:
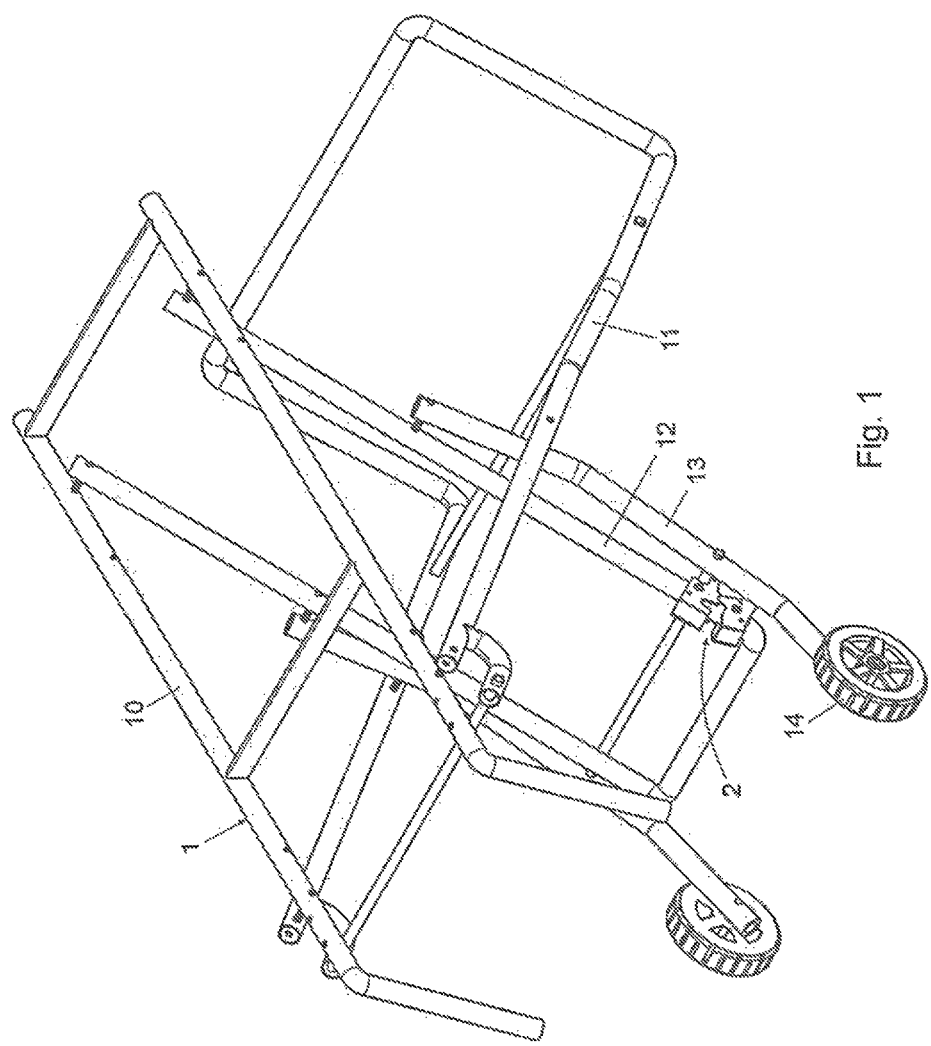
FIG. 1 shows a perspective view of the folding chassis of an electric cutting machine in the unfolded position, provided with the locking mechanism.

In FIG. 1, the folding chassis (1) for electric cutting machines comprises a principal arm (10) which has an oblique extension (101) at a first end for gripping it; a supporting base (11) fixed to a first end of the principal arm (10) by means of a rotation shaft (111); a tilting arm (12) fixed to a second end of the principal arm (10) by means of the corresponding rotation shaft (121) and an end arm (13) bearing wheels (14) and which is installed on the intermediate areas of the supporting base (11) and the tilting arm (12) by means of respective rotation shafts (131, 132).

Figure 7:
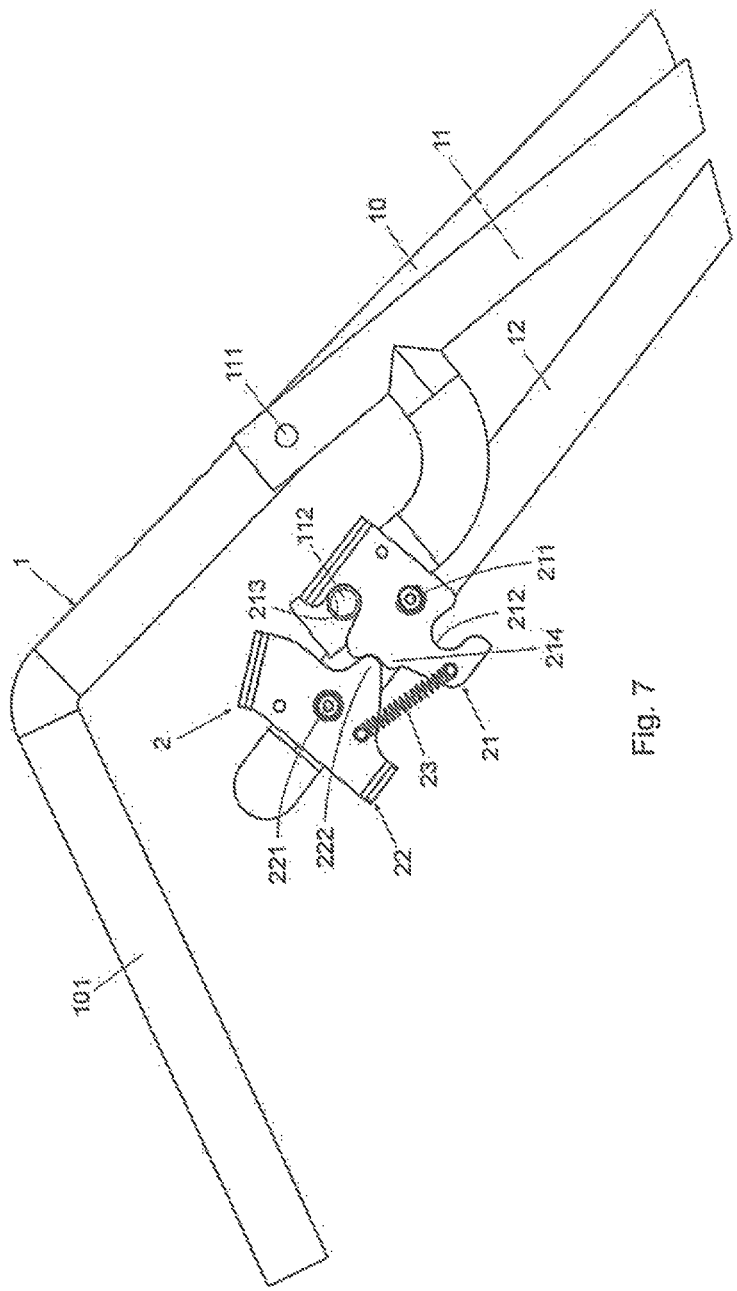
FIG. 7 shows an enlarged detail of FIG. 6 in which the locking mechanism can be observed in the same operative position.

With the aforementioned structure, the chassis (1) can be unfolded towards the position represented in FIG. 1, the end arm (13) being arranged practically aligned with the tilting arm (12), and can be folded towards a position represented in FIG. 7, wherein the end arm (13) collapses towards the free end of the supporting base (11).

The locking mechanism (2) responsible for fixing the chassis (1) both in the folded position and in the unfolded position is installed on the tilting arm (12) specifically in an area close to the free end of said tilting arm, that is, at the end opposite to that of articulation in the principal arm (10).

This locking mechanism (2) comprises a locking clip (21) and a trigger (22) installed on the tilting arm (12) by means of respective rotation shafts (211, 221) and an elastic element (23) that works by compression and which is fixed at the ends thereof to the locking clip (21) and the trigger (22) respectively.

Figure 2:
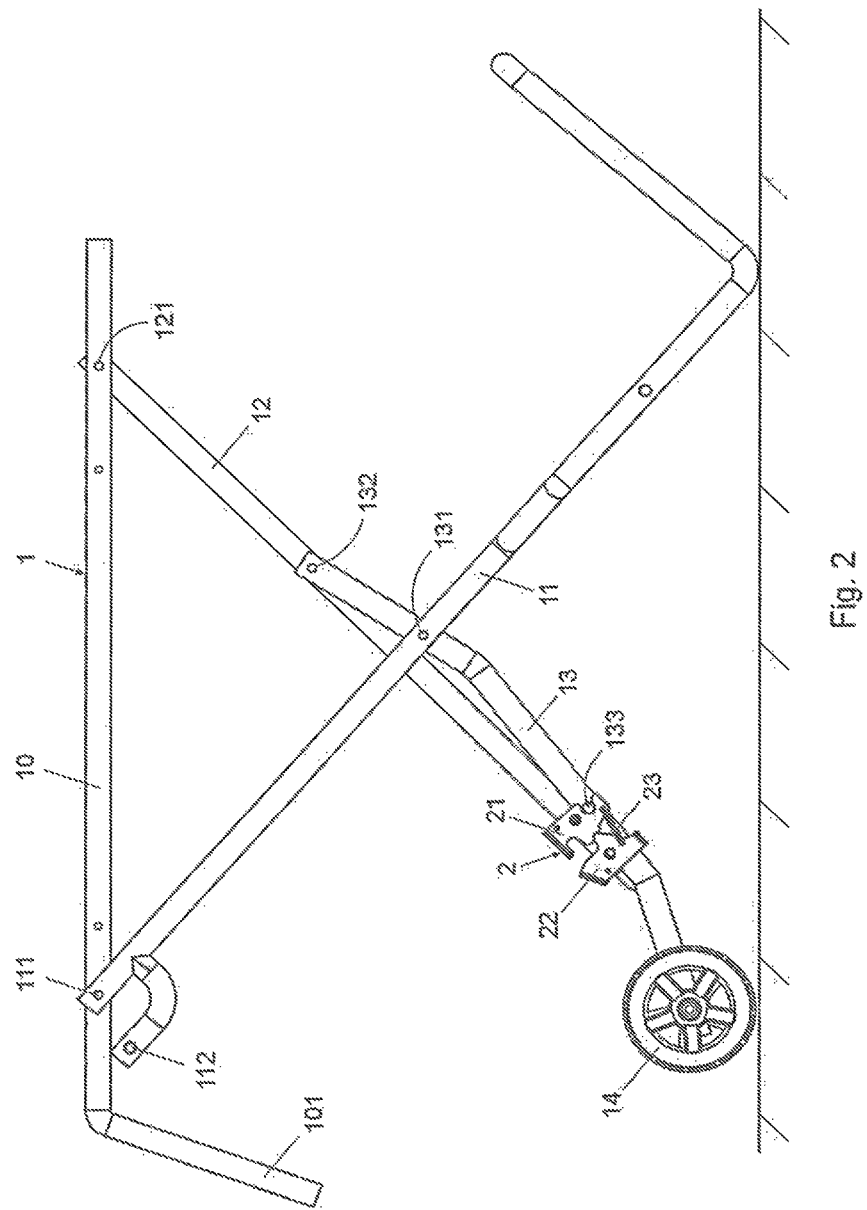
FIG. 2 shows an elevation view of the chassis fixed in the unfolded position by the locking mechanism.
Figure 3:
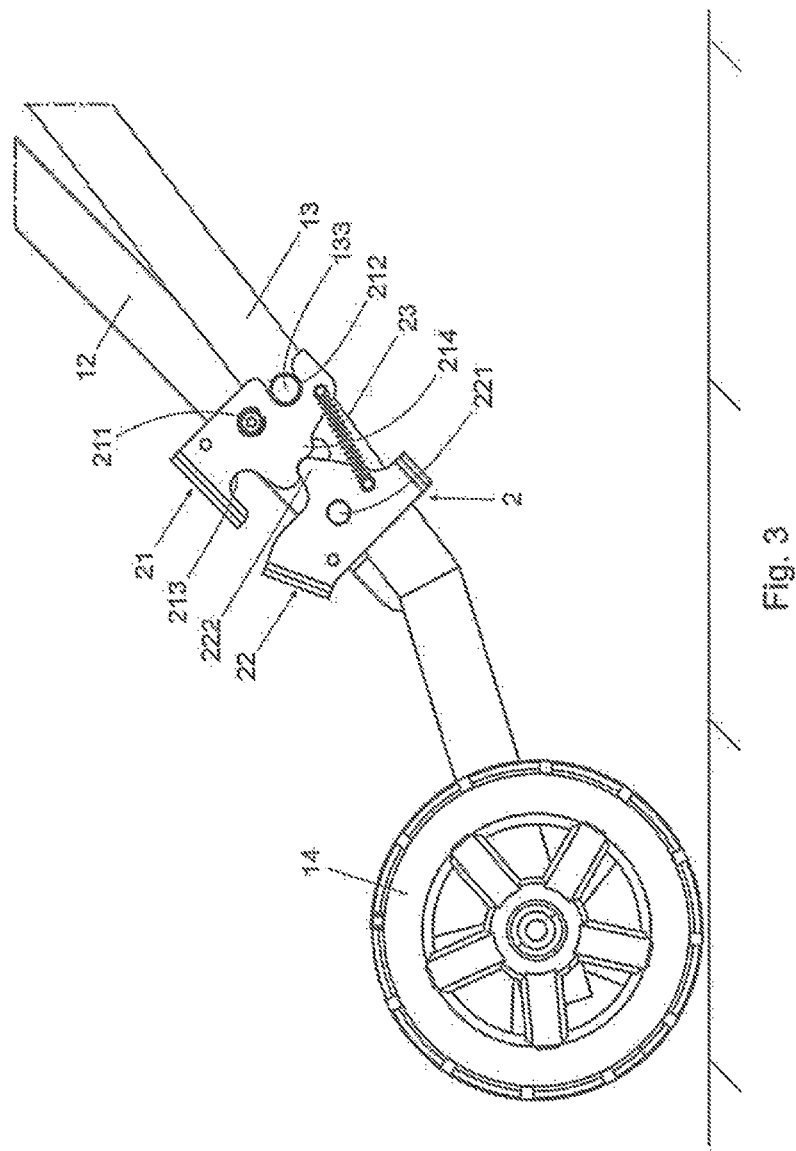
FIG. 3 shows an enlarged detail of FIG. 2 in which the locking mechanism can be observed in the operative position.
Figure 6:
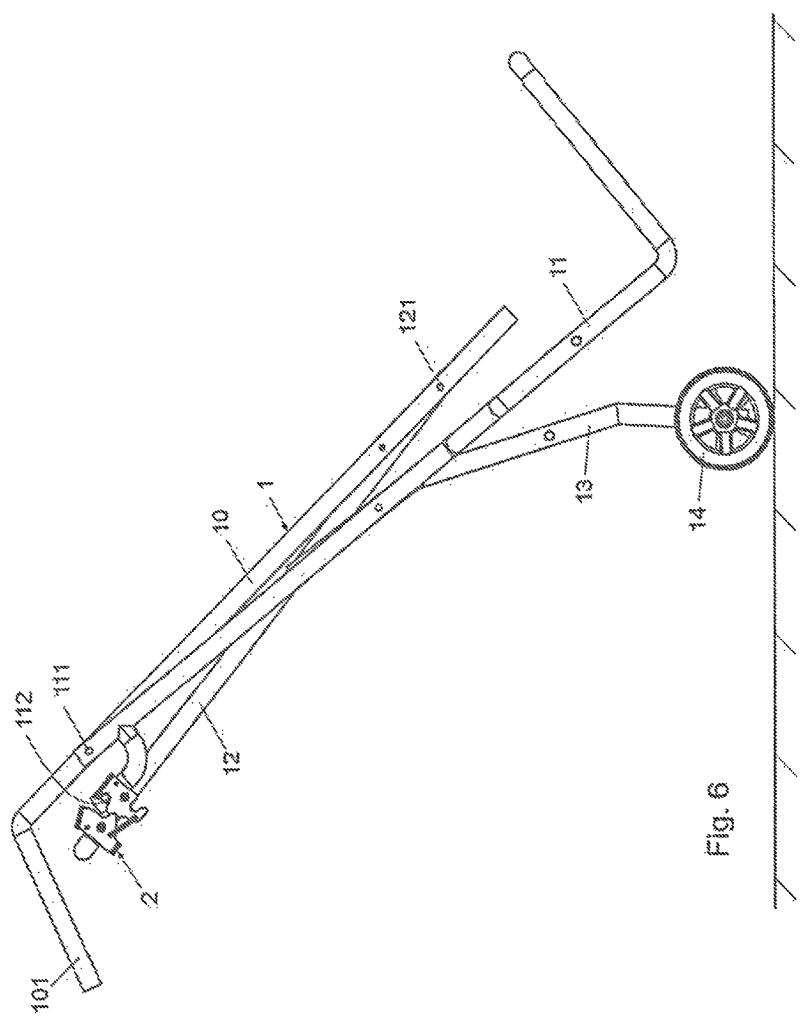
FIG. 6 shows an elevation view of the chassis fixed in the folded position by the locking mechanism.

The locking clip (21) is responsible for interacting with a first locking rod (133) fixed to the end arm (13) and with a second locking rod (112) fixed in the upper area of the supporting base to lock the chassis (1) in the unfolded position and in the folded position, as shown in FIGS. 2 and 3, and in FIGS. 6 and 7, respectively.

Figure 4:
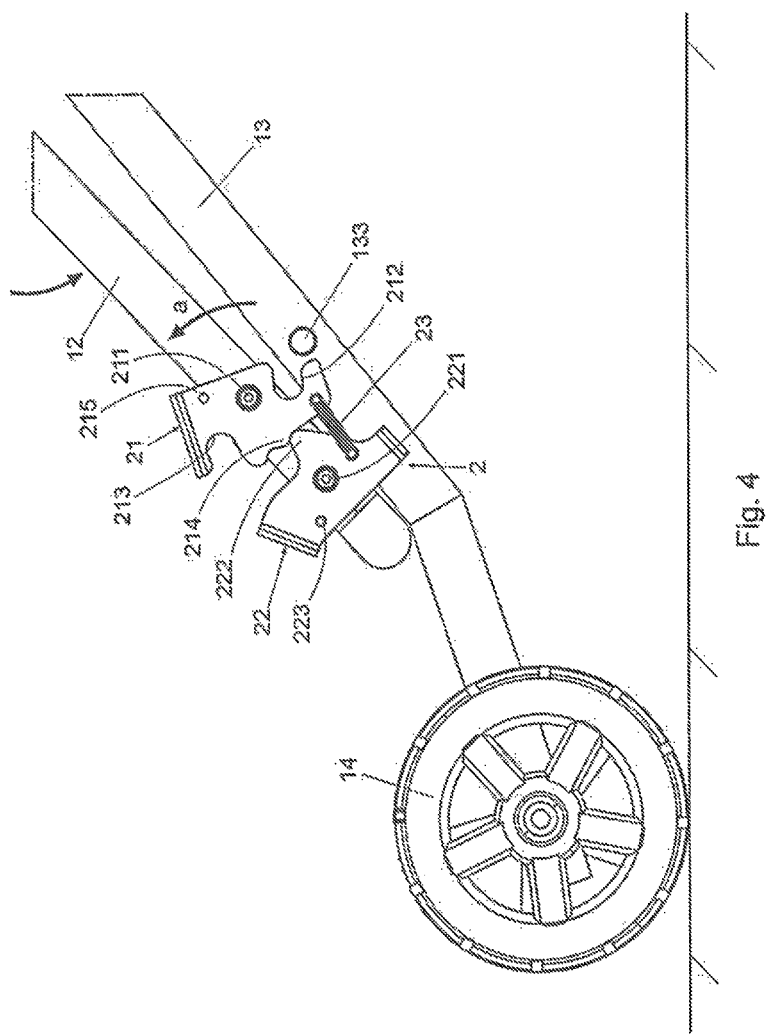
FIG. 4 shows an elevation detail of the locking mechanism during the actuation thereof towards the locked position of the chassis in the unfolded position.

The aforementioned locking clip (21) is capable of being turned with respect to the rotation shaft (221) between an operative locked position shown in FIG. 3 and an inoperative position for the unlocking of the chassis represented in FIG. 4.

Said locking clip (21) comprises a rear recess (212) for housing the first locking rod (133) of the chassis in the unfolded position and a front recess (213) for housing a second locking rod (112) in the folded position of the chassis (1), as shown in FIGS. 6 and 7.

As shown in FIG. 3, the rear recess (212) and the front recess (213) of the locking clip (21) are respectively arranged below and above the tilting arm (12) so that the elastic element (23) always tends to keep the locking clip (21) in an inoperative unlocked position with respect to the locking rods (112, 133).

The trigger (22) is capable of being turned with respect to the rotation shaft (221) between: a position for the retaining of the locking clip (21) in an operative position for the locking of the chassis shown in FIG. 3; and a free position, represented in FIG. 4, in which it enables the locking clip (21) to be displaced towards the inoperative unlocked position.

As can be observed in FIGS. 3 and 4, the trigger (22) comprises an appendix (222) which in the operative position of the mechanism for the locking of the chassis acts against a stop (214) of the locking clip (21), preventing the elastic element (23) from displacing the locking clip (21) towards an inoperative position and, consequently, unlocking the chassis (1).

As can be seen in FIG. 4, to lock the chassis (1) in the unfolded position, it is necessary to unfold said chassis and then manually turn the locking clip (21) in the direction "a" so that the rear recess (212) is coupled in the first locking rod (133) of the end arm (13), and reaches the locked position shown in FIG. 3.

When manually turning the locking clip (21), the trigger (22) turns in the same direction by the action of the elastic element (23), acting with the appendix (222) thereof against the stop (214) of the locking clip (21) retaining it in the locked position, and preventing the elastic element (23) from turning the locking clip (21) towards an inoperative position.

In the aforementioned FIG. 4, the locking clip (21) and the trigger (22) comprise pins (215) and (223) respectively that make contact with the tilting arm (12) in the unlocked position of the mechanism, forming turning stops.

Figure 5:
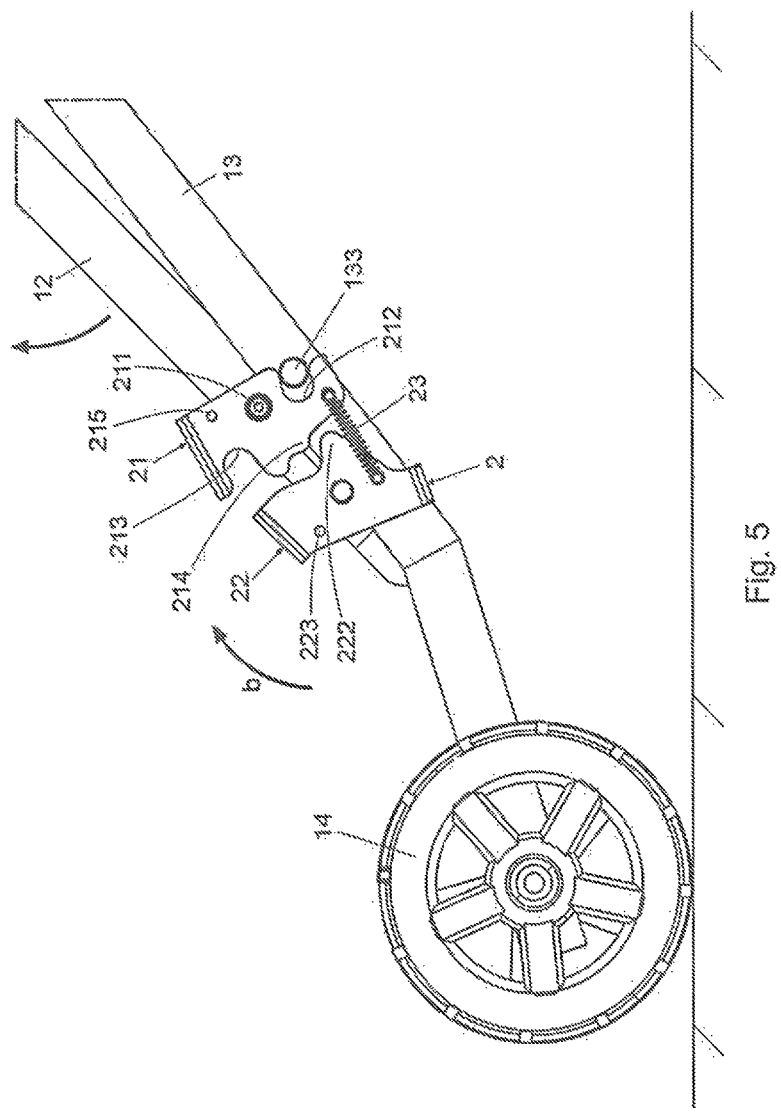
FIG. 5 shows an enlarged detail of the locking mechanism during the actuation thereof towards an inoperative position for the unlocking of the folding chassis.

As shown in FIG. 5, to unlock the chassis in the unfolded position represented in FIG. 3, it is sufficient to manually turn the trigger (22) in the direction "b", overcoming the traction of the elastic element (23) so that the appendix (222) is located below the stop (214) of the locking clip (21) and said locking clip (21) turns in the same direction, the rear recess (212) being uncoupled from the first locking rod (133).

FIG. 6 shows the chassis (1) locked in the folded position, the locking mechanism (2) acting on the second locking rod (112) fixed to the upper end of the supporting base (11).

In FIG. 7, the locking mechanism (2) is arranged in the same locked position represented in FIG. 3, only in this case it is the front recess (213) of the locking clip that couples the second locking rod (112).

Figure 8:
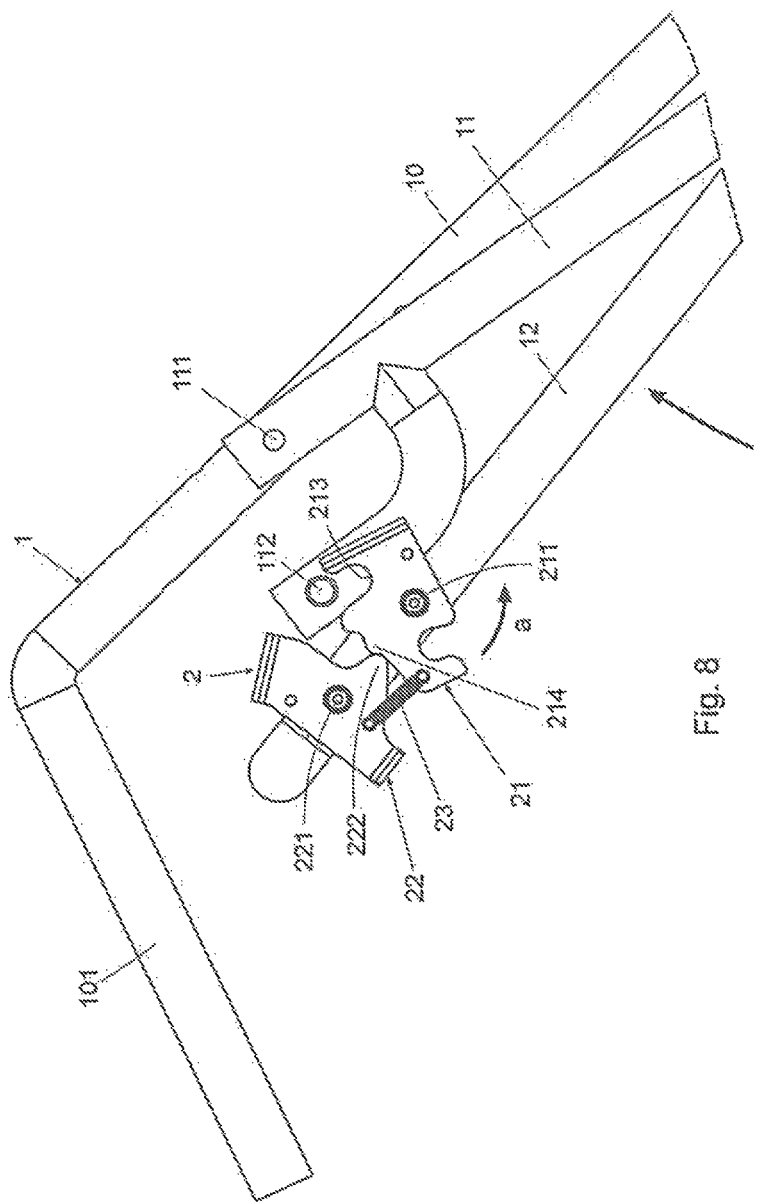
FIG. 8 shows an enlarged detail of the locking mechanism in a position prior to fixing the chassis in the folded position.

Also, as in the previous case, to lock the chassis from the folded position, it is sufficient to manually turn the locking clip in the direction "a" as shown in FIG. 8 so that the front recess (213) embraces the second locking rod (112) until reaching the position shown in FIG. 7, and the trigger (22) also turns in the same direction by the action of the elastic element (23), retaining the locking clip (21) in the operative locked position with the appendix (222) thereof.

Figure 9:
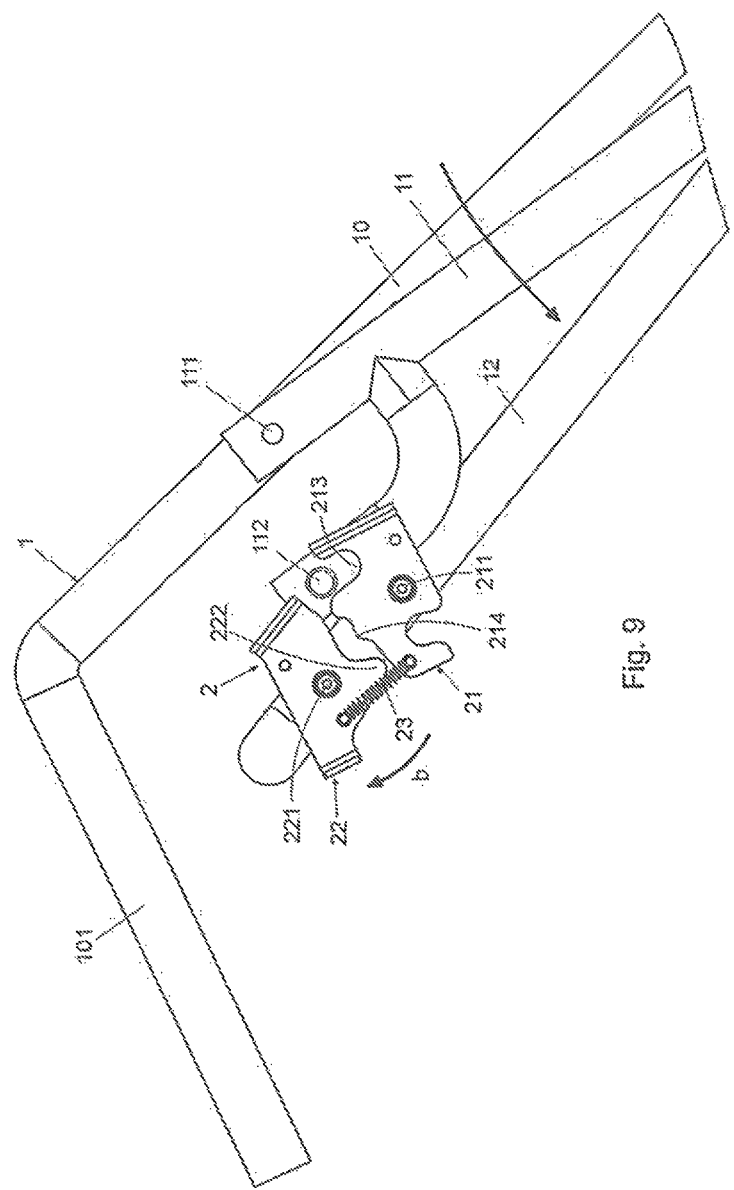
FIG. 9 shows an enlarged detail of the locking mechanism during the actuation thereof towards the inoperative position for the unlocking of the chassis.

As shown in FIG. 9, also as in the previous case, to unlock the locking mechanism (2), it is sufficient to manually turn the trigger (22) in the direction "b" so that the appendix (222) is located below the stop (214) of the locking clip (21) enabling said locking clip (21) to turn by the action of the elastic element 23 towards the inoperative position in which the front recess (213) uncouples from the second locking rod (112).

Having sufficiently described the nature of the invention, in addition to a preferred exemplary embodiment, it is hereby stated for the relevant purposes that the materials, shape, size and layout of the described elements may be modified, provided that it does not imply altering the essential features of the invention claimed below.

The invention claimed is:

1. A locking mechanism for folding chassis of electric cutting machines; said folding chassis (1) comprising: a principal supporting arm (10); a supporting base (11) and a tilting arm (12) that are collapsible with respect to the principal arm (10) and related to each other by an end arm

(13) bearing wheels (14) and that collapses together with the supporting base (11) and with the tilting arm (12) during the folding and unfolding of the chassis (1), wherein said locking mechanism comprises:

- a locking clip (21) installed on the tilting arm (12), the locking clip (21) being configured to turn between: an operative position for the locking of the chassis (1) in the folded position and in the unfolded position, and an inoperative position for unlocking of the chassis (1); said locking clip comprising a rear coupling recess (212) in a first locking rod (133) of the chassis (1) in the unfolded position; said first locking rod (133) being fixed to the end arm (13);
- a front coupling recess (213) in a second locking rod (112) of the chassis (1) in the folded position, said second locking rod (112) being fixed in an upper area of the supporting base (11); and in that the locking mechanism further comprises:
- a trigger (22) installed on the tilting arm (12), the trigger (22) being configured to turn and displace between: a position for retaining of the locking clip (21) in the operative position for the locking of the chassis (1); and a free position in which it enables the locking clip (21) to be displaced towards the inoperative position; and
- an elastic element that tends to displace the locking clip (21) towards the inoperative position, and to displace the trigger (22) towards the inoperative position for the unlocking of the chassis (1);
- wherein said trigger (22) comprises an appendix (222) which, in the operative position for the locking of the chassis (1), acts against a stop (214) of the locking clip (21), retaining it in said locked position, returning the locking clip (21) to the inoperative position by action of the elastic element (23), when the trigger (22) is manually displaced towards the free position; and
- wherein the rear recess (212) and the front recess (213) of the locking clip (21) are respectively arranged below and above the tilting arm (12), so that the elastic element (23) always tends to keep the locking clip (21) in an inoperative unlocked position with respect to the locking rods (112, 133).

2. The locking mechanism according to claim 1, wherein the locking clip (21) and the trigger (22) of the locking mechanism (2) are installed on the tilting arm (12) by means of respective rotation shafts (211, 221).

3. The locking mechanism according to claim 1, wherein the elastic element (23) works by traction and is fixed at the ends thereof to the locking clip (21) and to the trigger (22) respectively.

4. The locking mechanism according to claim 1, wherein the locking clip (21) and the trigger (22) comprise pins (215, 223) respectively that make contact with the tilting arm (12) in the unlocked position of the mechanism, forming turning stops.

5. The locking mechanism according to claim 1, wherein the principal arm (10) has an oblique extension (101) at a first end for gripping it.

6. The locking mechanism according to claim 2, wherein the elastic element (23) works by traction and is fixed at the ends thereof to the locking clip (21) and to the trigger (22) respectively.

7. The locking mechanism according to claim 2, wherein the locking clip (21) and the trigger (22) comprise pins (215, 223) respectively that make contact with the tilting arm (12) in the unlocked position of the mechanism, forming turning stops.

8. The locking mechanism according to claim 3, wherein the locking clip (21) and the trigger (22) comprise pins (215, 223) respectively that make contact with the tilting arm (12) in the unlocked position of the mechanism, forming turning stops.

9. The locking mechanism according to claim 2, wherein the principal arm (10) has an oblique extension (101) at a first end for gripping it.

10. The locking mechanism according to claim 3, wherein the principal arm (10) has an oblique extension (101) at a first end for gripping it.

11. The locking mechanism according to claim 4, wherein the principal arm (10) has an oblique extension (101) at a first end for gripping it.

* * * * *